United States Patent [19]

Kullmann et al.

[11] 4,037,124

[45] July 19, 1977

[54] COOLING ARRANGEMENT FOR THE ROTOR OF AN ELECTRIC MACHINE

[75] Inventors: Dieter Kullmann, Langenzenn; Peter Henninger, Erlangen; Lutz Intichar, Nurnberg, all of Germany

[73] Assignee: Siemens Aktiengesellschaft, Munich, Germany

[21] Appl. No.: 605,536

[22] Filed: Aug. 18, 1975

[30] Foreign Application Priority Data

Aug. 21, 1974 Germany .............................. 2440132

[51] Int. Cl.² .............................................. H02K 9/00
[52] U.S. Cl. .............................................. 310/52
[58] Field of Search ........................ 310/10, 40, 52, 54, 310/61, 64, 165, 198, 201, 265, 205, 214; 336/55

[56] References Cited

U.S. PATENT DOCUMENTS

| | | | |
|---|---|---|---|
| 3,381,154 | 4/1968 | Madsen | 310/265 |
| 3,471,726 | 10/1969 | Burnier | 310/54 |
| 3,517,231 | 6/1970 | Massar | 310/52 |
| 3,679,920 | 7/1972 | MacNab | 310/52 |
| 3,743,875 | 7/1973 | Smith | 310/205 |
| 3,816,780 | 6/1974 | Smith | 310/52 |
| 3,821,568 | 6/1974 | Gillet | 310/214 |
| 3,942,053 | 3/1976 | Abolins | 310/10 |

FOREIGN PATENT DOCUMENTS

| | | | |
|---|---|---|---|
| 1,279,182 | 10/1968 | Germany | 310/10 |

Primary Examiner—R. Skudy
Attorney, Agent, or Firm—Kenyon & Kenyon, Reilly, Carr & Chapin

[57] ABSTRACT

A cooling arrangement for the rotor of an electric machine with longitudinal slots having disposed therein exciter winding sections which must be cooled to a low temperature, the arrangement having a feed and discharge line, in which a multiplicity of individual cooling canals running in the circumferential direction and a multiplicity of individual radial coolant feed lines and/or discharge lines are provided for each winding section over its axial length so that the cooling arrangement can be optimized with regard to the thermodynamic pressure losses of the coolant, its temperature rise and the heat transfer conditions while at the same time achieving a favorable space factor of the conductor material within the slots.

12 Claims, 3 Drawing Figures

COOLING ARRANGEMENT FOR THE ROTOR OF AN ELECTRIC MACHINE

BACKGROUND OF THE INVENTION

The invention relates to electric machines in general and more particularly to a cooling arrangement for the rotor of an electric machine, particularly a synchronous machine, which is provided with longitudinal slots each having a section of an exciter winding which is to be cooled to a low temperature disposed therein, the cooling arrangement having at least one coolant feed line and a discharge line.

The use of deeply cooled windings such as superconducting windings in electric machines permits a substantial increase of the induction in the air gap between the rotating machine part, e.g. the rotor, and the stationary machine part, e.g. the stator. Furthermore, higher current densities are obtained in windings with superconductors losses are practically eliminated. Therefore, the ratio of the power output to the volume and the weight is considerably higher in machines having superconducting exciter windings than in a machine of conventional design.

In U.S. Pat. No. 3,821,568 an a-c generator is disclosed which contains a rotor having an exciter winding which is cooled to a low temperature. The rotor is provided with longitudinal winding sections. These winding sections consist of a multiplicity of conductor layers arranged on top of each other in the radial direction and are subdivided in the circumferential direction into four conductor stacks insulated from each other (FIG. 3). Since these conductor stacks must be maintained at a low temperature, e.g. at helium temperature, if superconductor material is used for the conductors of the winding, they are partially wetted by a coolant. To accomplish this cavities through which the coolant is conducted are provided in a slot for each winding section. These cavities, which serve as cooling canals, permit the coolant to flow in the radial direction as well as in a direction parallel to the the axis of the rotor. At the bottom of the slot they are connected with chambers which serve as axial collecting canals for feeding and discharging the coolant. The coolant therefore rises from a collecting canal at the bottom of the slot radially to the cover of the slot at the two inner conductor stacks, then flows past the two outer conductor stacks and is fed to two further collecting canals at the slot bottom.

In this disclosed rotor, the coolant is fed in at the collecting canals at one rotor end and flows in the longitudinal direction of the rotor through the entire slot in planes along the conductor stacks. Since the coolant in the collecting canals on its way in is also in thermal contact, through metallic partitions, with the warmer coolant flowing in the return direction, excess temperatures can occur in this cooling arrangement for the rotor at the rotor parts facing away from the coolant inlet point. If superconductive material is usedfor the conductors of the winding a transition of the superconductors into the normal conducting state can therefore occur.

SUMMARY OF THE INVENTION

It is therefore an object of the invention to improve the cooling arrangement of such an electric machine so that coolant can be fed to the winding sections in the slots with at least approximately equal temperature over the entire length of the rotor. In addition, it is an object to be able to select the area wetted by the coolant in the winding sections.

According to the present invention, this problem is solved in an electric machine, particularly in a synchronous machine, of the type mentioned above by having each winding section interwoven over its entire axial length by a multiplicity of individual cooling canals which run at least approximately in the circumferential direction of the rotor and in addition by providing for each winding section a multiplicity of individual coolant feed lines and/or discharge lines which run at least approximately radially and are connected with the cooling canals.

The advantages of the cooling arrangement of the present invention reside particularly in the fact that the length of the cooling canals in the winding sections of the exciter winding is selectable. It is therefore possible to set up a cooling circuit for the exciter winding which can be optimized with respect to the thermodynamic pressure losses of the coolant, its temperature rise and its heat transfer conditions, i.e., an optimum cooling effect can be achieved with minimum wetting of the conductors in the winding sections and without the danger of the conductors of the exciter winding becoming normally conducting. This also gives a correspondingly favorable space factor for the conductor material within the slots.

According to a further feature of the present cooling arrangement, when used with a rotor having winding sections of several conductor layers which are arranged on cylinder surfaces concentric to the rotor axis, the conductor layers are mutually spaced in the radial direction. The cavities thus developed between the adjacent conductor layers serve as cooling canals. The longitudinal slot is always defined in the circumferential direction by two radial, tooth-shaped intermediary bodies. Bars which extend from one of the tooth-shaped intermediary bodies to the other intermediary body are particularly useful for spacing the conductor layers. With these bars cavities which serve as cooling canals for conducting the coolant through the winding sections in the circumferential direction can advantageously be developed between adjacent conductor layers and between the tooth-shaped intermediary bodies. The number of bars required is a function of the necessary mechanical strength of the winding section within the individual slot. As far as the circumferential direction is concerned, they may be arranged straight or at an angle, the latter being preferred. Through an inclined arrangement of these bars the lengths of the cooling canal in the circumferential direction can be adjusted while the mechanical strength of the winding section remains constant without the necessity of reducing the space factor of the conductor material with the slot correspondingly.

DETAILED DESCRIPTION OF THE PREFERRED EMBODIMENT

Figure 1:
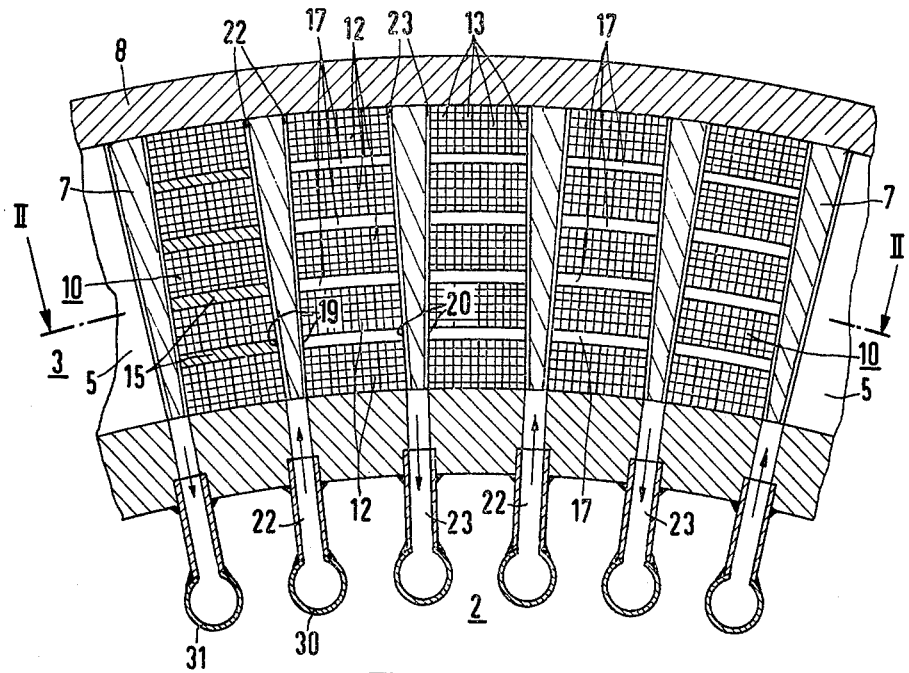
FIG. 1 is a partial cross section through a rotor with a cooling arrangement in accordance with the present invention.

A portion of a rotor body 2 is shown in cross section in FIG. 1. The rotor will include, for instance, a hollow cylindrical shaft, not shown in the figure, on whose outer circumference tie bars are arranged in star-fashion and uniformly distributed. At their outer ends, these tie bars hold a hollow, cylindrical support 3, arranged concentrically with the shaft. Support 3 consists of a high strength, nonmagnetic material of poor thermal conductivity such as, for instance, stainless steel, titanium or a material reinforced with synthetic fibers. On its outside it is provided with slots 5 which may, for instance, be milled. These slots have mutual equal spacings in the circumferential direction and are of approximately rectangular cross section. Between every two adjacent slots 5, the support 3 contains, after milling, tooth-like intermediary spacers 7 with approximately trapezoidal cross section. An outer cylinder 8 is arranged around the support 3, i.e. around the common outer cylindrical surface of the intermediary spacers 7. This outer cylinder will be of nonmagnetic material such as, for instance, stainless steel or titanium and is tightly connected to the intermediary bodies 7 to permit force transmission. It is made relatively thin so as not to appreciably affect the electromagnetic coupling between the exciter winding in the slots 5 and a stationary stator winding which is arranged concentrically about the rotor body 2 but not shown in the figure.

The exciter winding is placed in the slots 5 in the form of individual, solid winding sections 10. These winding sections 10 each consist, for instance, of five conductor layers 12 arranged on top of each other. Conductor layers 12, which are arranged on concentric cylinder surfaces about the axis of the rotor body are each formed, for instance, by four adjacent winding packages 13 of superconductors which are insulated from each other. The superconductors are in the form of ribbons and have their flat sides abutting. Several turns of these superconductors form respective solid, insulated winding packages which are of approximately rectangular cross section. The conductor material may be a niobium-titanium or a niobium-tin alloy which is kept at a low temperature by means of a circulating coolant such a supercritical helium.

The cooling arrangement according to the present invention cools the exciter winding. It is advantageous if the individual conductor layers 12 of the exciter winding within the slot 5 are slightly spaced from each other. To accomplish this individual bars 15 shown in more detail in FIG. 2 can be used as spacer elements. The bars are arranged between the intermediate spacers 7 in such a way that their end faces rest thereagainst with a close fit. Thus, individual cooling canals 17 are developed between adjacent conductor layers 12 in the circumferential direction of the winding sections 10. The canals 17 are separated from each other by the bars and thus prevent the coolant from flowing parallel to the axis between adjacent cooling canals 17. At its two ends 19 and 20 facing the intermediary spacers 7 of a slot each of the cooling canals 17 is connected respectively with a radial feed line 22 and a corresponsing discharge line 23 for the coolant. Drill holes or milled or other recesses in the intermediary spacers 7 can be used as the feed and discharge lines. As indicated on the figure by arrows, the coolant will then rise on the one side of a tooth-like intermediaryspacer 7 in the feed line 22, flow through the parallel cooling canals 17, in the winding section 10 and be discharged from the winding section at the next intermediary spacer through a discharge line 23. The feed and discharge lines open into respective collecting manifold lines 30 and 31, not further detailed in the figure, which are brought out from the interior of the rotor body and are connected to an external unit. Each of the radial coolant feed and discharge lines 22 and 23 advantageously is coupled to both sides of a common tooth-like intermediary spacer 7. As such they form a common coolant feed and discharge lines 22 and 23, repsectively for two separate slots.

Figure 2:
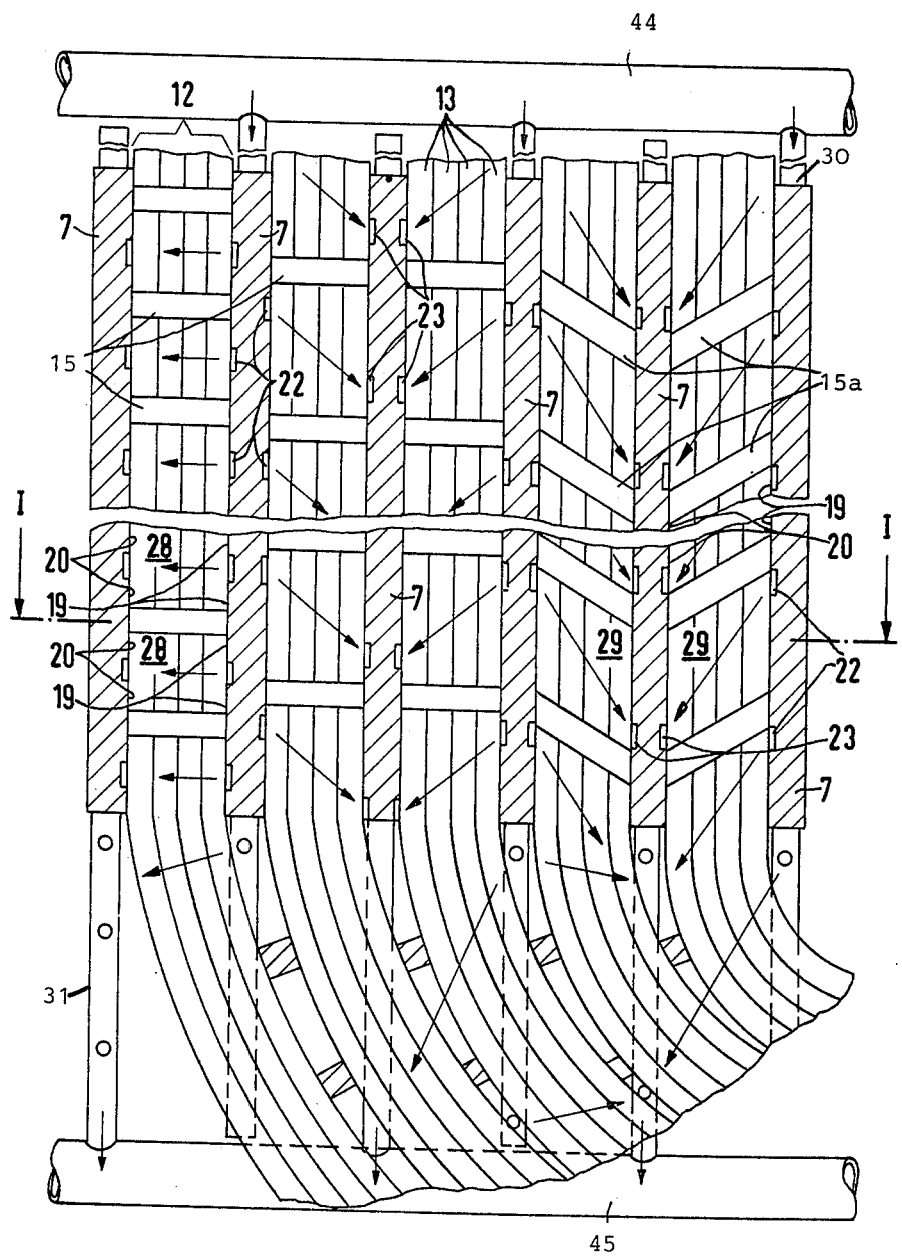
FIG. 2 shows a portion of a cross section in the circumferential direction through the rotor winding according to FIG. 1.

FIG. 2 is a partial cross section through the rotor body of FIG. 1 in a cylinder surface concentric with the rotor axis. Between each two intermediary spacers 7 several concentric conductor layers 12, each consisting of four winding packages 13 of ribbon-shaped conductors are arranged. Only one layer for each slot is seen on the figure. The cross section is taken so that the spacer bars 15 between two concentric, adjacent conductor layers 12 can be seen. Two types of individual bars are shown and designated 15 and 15a. Both are disposed so that their ends rest against the intermediary spacers 7 with a tight fit so that gaps parallel to the axis between their end faces and the intermediary spacers are avoided. The bars 15 are perpendicular to the intermediary spacers 7 and the bars 15a disposed at an angle to the intermediary spacers 7. The bars, which lie between two respective conductor layers of a common slot arranged concentrically to each other, are spaced from each other in the longitudinal direction of the rotor. Due to their height, a cavity to conduct a coolant is formed between the adjacent conductor layers. This cavity is subdivided in the longitudinal direction of the rotor into individual, separated cooling channels 28 and 29 by the bars 15 and 15a. Each cooling canal 28 and 29 is connected at its ends 19 and 20 directly to an essentially radially arranged coolant feed line 22 and to a corresponding coolant discharge line 23. These feed and discharge lines for one cooling canal 28 or 29 may be arranged, for instance, in a common radial cross-sectional plane with respect to the rotor body 2. However, they can also be displaced relative to each other in the longitudinal direction of the rotor. Thus, correspondingly longer cooling canals between the conductor layers are obtained.

As indicated in FIG. 2 by arrows, the coolant flows from a common manifold 44 through manifolds 30 and the feed lines 22 into the cooling canals 28 and 29. It then flows through the latter in the direction indicated and is returned through the discharge lines 23 and manifolds 31 and a common manifold 45.

With the cooling arrangement according to the present invention the coolant has approximately the same temperature e.g. 3.5 K, in all coolant feed lines along the entire rotor, and leaves all the coolant discharge lines 23 at about the same temperature, e.g. 4.2K.

Since the bars 15 and 15a between the intermediary spacers 7 may be perpendicular or at an angle to the latter, the cooling canals 28 defined by bars 15 have a rectangular base area and the cooling canals 29 defined by the bars 15a have a base area in the shape of a parallelogram. The size of these base areas can be adjusted through spacing of adjacent bars 15 and 15a. With the radial height of the bars 15 and 15a given, the volume of a cooling canal or the conductor surface to be wetted by the coolant in a cooling canal can the be selected so that the thermal losses occurring in a winding section 10 will always be removed with a minimum throughput of coolant without the danger of quenching, i.e., the danger that one or more conductors become normally conducting. In determining the size of cooling canals 28 and 29 thus formed the required mechanical strength of the winding sections 10 must be also taken into account. Flexing of the conductors in the radial direction and other movements of the conductor, which may also lead to quenching, must always be prevented.

Figure 3:
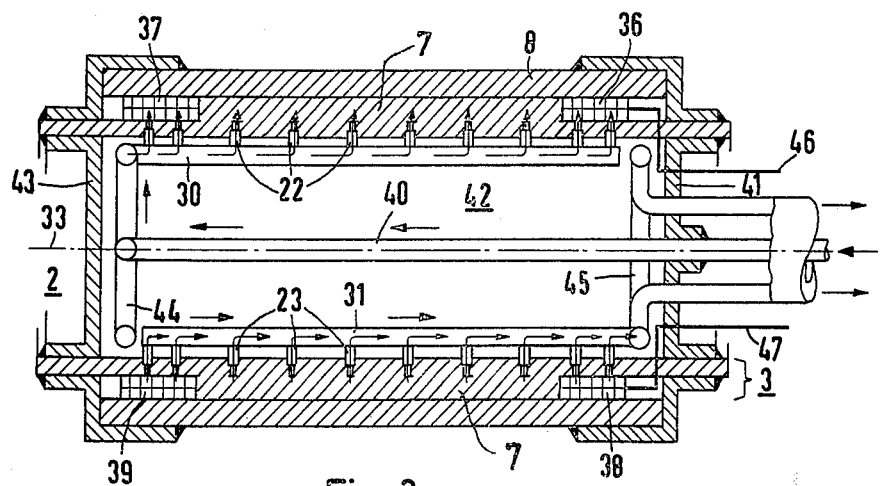
FIG. 3 is a longitudinal cross section through a rotor with a cooling arrangement according to the invention.

The position of the manifolds 30 and 31 and manifolds 44 and 45 according to FIG. 2 is shown in detail by the longitudinal cross section through the rotor of FIG. 3. In this figure, the rotor body 2 is detailed only in part. It is supported rotatably about an axis of rotation 33 and contains the aforementioned hollow cylindrical support body 3 which the supports the exciter winding which is to be cooled to a low temperature. Support body 3, as noted above, has slots in the longitudinal direction of the rotor formed from the outside. The winding sections of the exciter winding are accomodated in these slots. The longitudinal cross section of FIG. 3 is through two tooth-like intermediary spacers 7 which are diametrically opposed. Thus, only the winding ends 36 to 39 of the exciter winding are visible on FIG. 3.

In order to supply the coolant to the individual cooling canals in the winding sections of the exciter winding, an axial feed line 40 is brought centrally into the interior 42 of the rotor body 2 at the one end face of the latter and extends almost to the opposite end face 43 of the rotor body inside the interior 42. It opens into a ring shaped distribution manifold 44 which is arranged concentrically about the rotor axis 33 and to which the manifolds 30 running parallel to the exciter winding are connected. One manifold pipe is provided, for instance, for each two winding sections of the exciter winding. In the figure, only the manifold pipe 30 arranged along the upper tooth-like intermediary spacer 7 is detailed. From this manifold line 30 several coolant feed lines 22 through which the coolant is supplied to the coolant canals which are arranged on both sides of the tooth-like intermediary 34 branch out in the radial direction.

The coolant discharge from the cooling canals which are arranged on both sides of the tooth-like intermediary spacers 7 are also illustrated on FIG. 3. The discharge lines 23 open into a manifold line 31 parallel to the axis. Manifold line 31 is connected to a ring-shaped distribution manifold 45 disposed concentrically to the rotor axis 33 in the interior 42. The coolant is conducted out of distribution manifolds 45, for instance, at the same end face 41 of the rotor through which the central feed line 40 is brought into the interior 42 of the rotor body. The direction of the coolant flow is indicated in the figure by individual arrows.

The illustrated embodiment is based on subdividing each cavity between each two conductor layers of a winding section within a slot into 10 individual cooling canals by individual bars 15 which are arranged side by side in the longitudinal direction of the rotor. For each individual winding section in a slot, 10 feed lines 22, arranged one behind the other in the lengthwise direction of the rotor and as many discharge lines 23 are thus required. On the FIG. 3 only the portion of feed and discharge lines 22 and 23 up to the end of the intermediate spacers 7 facing the rotor axis 33 are visible. At these ends these lines branch into two radial, approximately parallel feed and discharge lines as illustrated on FIGS. 1 and 2.

Also shown on FIG. 3 are two electrically insulated current leads 46 and 47 for supplying current to the exciter winding. Instead of the separate manifold pipes 30 and 31 according to FIGS. 1 to 3 in the interior of the rotor body, other arrangements in which parts of the rotor body are provided with cavities in the longitudinal direction of the rotor for use as coolant collecting lines can be used. With a rotor body which, for instance, contains an inner cylinder on whose outer surface the support body 3 or the intermediary bodies 7 are arranged in a force-transmitting manner, axial holes or other recesses may be provided in the inner cylinder underneath the winding sections and can be used to conduct the coolant in the longitudinal direction of the rotor.

In addition, the cooling canals in several winding sections 10 which are arranged adjacent to each other in the circumferential direction may optionally be connected to each other. Thus, cooling canals, for instance, which lie on cylinder surfaces concentric to the rotor axis, can be connected to each other by holes in the circumferential direction through the intermediary spacers 7. Such a design results in corresponding reduction of coolant feed and discharge lines 22 and 23. These and other modifications may be made without departing from the spirit of the invention which is intended to be limited solely by the appended claims.

We claim:

1. In a cooling arrangement for the forced cooling of the rotor of an electric machine both during standstill and rotation, which rotor has a plurality of longitudinal slots each having disposed therein a winding section of a superconductive excitation winding which is to be cooled to a superconducting temperature, each winding section being provided with at least one coolant feed line and one associated coolant discharge line, the coolant feed and discharge lines being connected to corresponding supply and collection lines which extend through the interior space enclosed by the excitation winding, the improvement comprising:
   a. the coolant feed lines and coolant discharge lines comprising a multiplicity of at least approximately radially extending coolant feed lines and coolant discharge lines incrementally spaced over the entire axial length of each winding section, each coolant discharge line circumferentially separated from its associated coolant feed line; and
   b. means forming at least one cooling canal between each coolant feed line and its associated coolant discharge line extending at least approximately in the circumferential direction of the rotor, said means separating said cooling canals such that there is no direct connection to the cooling canals extending between neighboring axially spaced coolant feed lines and discharge lines.

2. Apparatus according to claim 1 wherein each end of each cooling canal is coupled to a coolant line.

3. Apparatus according to claim 1 wherein said longitudinal slots are defined in the circumferential direction by radial, tooth-like intermediary spacers, said spacers having cavities formed therein to provide radial coolant lines.

4. Apparatus according to claim 3 wherein said cavities comprise milled out spaces.

5. Apparatus according to claim 3 wherein said cavities comprise drill holes.

6. Apparatus according to claim 3 wherein said cavities comprise recesses.

7. Apparatus according to claim 1 wherein said winding sections comprise several conductor layers arranged on cylinder surfaces concentric with the rotor axis and said means forming individual cooling channels comprise means spacing said conductor layers from each other in the radial direction to form cavities between adjacent conductor layers.

8. Apparatus according to claim 7 wherein said longitudinal slots are defined in the circumferential direction by radial, tooth-like intermediary spacers and wherein said means spacing comprise bars extending from the one tooth-like intermediary spacer of a slot to the other intermediary spacer with their end faces resting against said intermediary spacers with a tight fit.

9. Apparatus according to claim 8, wherein bars are arranged parallel to a radial cross-section plane.

10. Apparatus according to claim 8 wherein bars are arranged at an angle to a radial cross section plane.

11. Apparatus according to claim 8 wherein at least some of the cooling canals situated in adjacent winding sections are connected with each other by means of openings in said intermediary spacers.

12. Apparatus according to claim 8 wherein at least some of the cooling canals have coolant feed lines and discharge lines arranged mutually displaced in the longitudinal direction of the rotor.

* * * * *